United States Patent Office 3,528,967
Patented Sept. 15, 1970

3,528,967
$N^1$-ACETYL-$N^1$-(CYCLOPROPYL-4-PYRIMIDINYL)-SULPHANILAMIDES
Markus Zimmermann, Riehen, Switzerland, assignor to Geigy Chemical Corporation, Ardsley, N.Y., a corporation of New York
No Drawing. Filed Mar. 14, 1967, Ser. No. 622,901
Claims priority, application Switzerland, Apr. 13, 1966, 5,350/66
Int. Cl. A61k *27/00;* C07d *51/44*
U.S. Cl. 260—239.75                 3 Claims

ABSTRACT OF THE DISCLOSURE $N^1$ - acetyl - $N^1$ - (4 - pyrimidinyl) - sulphanilamides substituted by a cyclopropyl group in 2-, 5- or 6-position, which are antibacterial agents against gram-positive bacteria such as staphylococci, streptococci, pneumonococci and against gram-negative bacteria such as salmonella, escherichia and klebsiella strains; pharmaceutical compositions containing the aforesaid pyrimidines as antibacterial ingredients, and a method of treating diseases caused by such bacteria, by administration of such pyrimidines or pharmaceutical compositions containing them.

FIELD OF THE INVENTION

The present invention concerns new sulphanilamide derivatives, processes for the production thereof, medicaments which contain the new compounds and the use thereof.

SUMMARY OF THE INVENTION

The invention provides in a first aspect novel sulphanilamido-pyrimidines of the formula

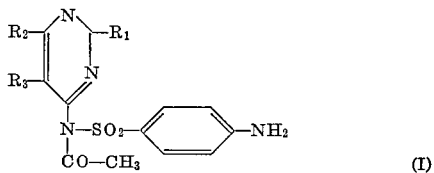

wherein a single one of $R_1$, $R_2$ and $R_3$ represents the cyclopropyl group, and, when not representing the cyclopropyl group, $R_1$ and $R_2$ independently of each other represent hydrogen, halogen atoms, low alkyl, alkoxy or alkylthio groups, and $R_3$ represents hydrogen, a low alkyl or alkoxy group; these novel compounds have an excellent antibacterial action while being practically harmless to mammals when used in antibacterially effective dosages, and are, therefore, useful as antibacterial agents in the treatment of infectious diseases.

In a second aspect, the invention provides pharmaceutical compositions containing an antibacterially effective amount of a compound according to the invention and a pharmaceutically acceptable carrier therefor.

A third aspect of the invention provides for a method of treating infectious diseases in mammals by administering to an individual suffering therefrom an antibacterially effective amount of a compound according to the invention.

DETAILED DESCRIPTION OF THE INVENTION AND PREFERRED EMBODIMENT

In the compounds of general Formula I, $R_1$, $R_2$ and $R_3$ as alkyl groups are, e.g. the methyl, ethyl, propyl or the isopropyl group and, as alkoxy groups they are, e.g. the methoxy, ethoxy, propoxy or the isopropoxy group. In addition, as alkylthio groups, $R_1$ and $R_2$ are, e.g. the methylthio or the ethylthio group.

As halogen atoms $R_1$ and/or $R_2$ represent especially chlorine or bromine, but most preferably chlorine.

A preferred compound is $N^1$ - acetyl - $N^1$ - (6 - cyclopropyl-4-pyrimidinyl)-sulphanilamide.

To produce these new compounds, a compound of general Formula II

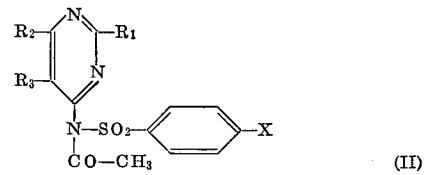

wherein X represents a group which can be converted by reduction into the amino group, and $R_1$, $R_2$ and $R_3$ have the meanings given in Formula I, is reduced or, if desired, a compound of the general Formula II wherein X is a substituted methylene amino group is partially hydrolysed, i.e. the $N^1$-acetyl group is maintained. Groups which can be converted by reduction into the amino group are, e.g. the benyloxycarbonylamino group (carbobenzyloxyamino group) and the nitro group, also, e.g. substituted methylene amino groups such as the benzylidene amino group as well as substituted azo groups such as the phenylazo or p-dimethylaminophenylazo group. In the azo compounds mentioned, the amino group is formed from the nitrilo radical N≡, bound to the benzene ring by one of its three valences. A corresponding nitrilo radical is also present in the N,N' - diacetyl - azobenzene - 4,4' - disulphonamides both sulphonamide groups of which carry identical 4-pyrimidinyl radicals substituted corresponding to the definition of $R_1$, $R_2$ and $R_3$, and on the reduction of which two molecules of a compound of general Formula I are formed. The reduction to the amino group of groups X which can be reduced or spit by reduction can be performed catalytically, e.g. by means of hydrogen in the presence of a palladium catalyst or of Raney nickel, in an inert organic solvent such as dioxane or ethanol, but also other processes such as the reduction of nitro groups and also azo groups by means of iron in acetic or hydrochloric acid can be used. The benzylidene amino group in particular is suitable as substituted methylene amino group X which can be split by hydrolysis. Compounds of general Formula II which contain this group can be partially hydrolysed under careful conditions, e.g. by heating with water to 40° or higher, to form compounds, of general Formula I.

Starting materials of the general Formula II can be obtained, e.g. by reacting a derivative of a p-substituted benzene sulphonic acid corresponding to the general Formula III

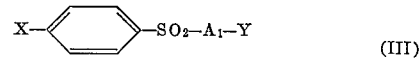

with a compound of the general Formula IV

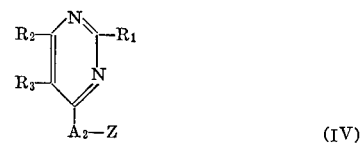

wherein one of the two symbols $A_1$ and $A_2$ represents the amino group (—NH—) and the other the direct bond, and Y and Z represents reactive radicals which can be split off together, and $R_1$, $R_2$ and $R_3$ have the meanings given in Formula I and X has that given in Formula II, the reaction optionally being performed in the presence of an acid binding agent, to form a compound of general Formula V

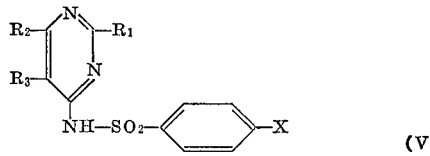

wherein $R_1$, $R_2$ and $R_3$ have the meanings given in Formula I and X has that given in Formula II, and reacting the latter compound with acetanhydride, in the presence of pyridine, at room temperature or moderately elevated temperature. For example, acetanhydride is used in multiple excess and, together with pyridine, serves at the same time as reaction medium. Should the compound obtained of general Formula V contain halogen atoms, particularly chlorine atoms as radicals $R_1$ and/or $R_2$, they can, if desired, be reacted before the acetylation with a metal compound of a low alkanol or alkane thiol in order to replace the halogen atom(s) by one or two low alkoxy or alkylthio groups. The various possibilities for the symbols $A_1$, $A_2$, Y and Z, the performance of the reaction of the corresponding compounds of the general Formulae III and IV and also the production of the latter group of compounds, which are new substances, is further illustrated below.

If, in the compound of general Formula III, $A_1$ is the imino group and, in that of general Formula IV, $A_2$ is the direct bond, Y is, e.g. a monovalent cation, particularly an alkali metal ion or the normal equivalent of a polyvalent cation, and Z is a halogen atom, particularly a chlorine or bromine atom, also a cyanamino or nitroamino radical or, provided $R_1$ and/or $R_2$ is/are not (an) alkylthio group(s), it is a low alkylsulphonyl radical. In addition, in compounds of the general Formula IV, Z can also represent the grouping of Formula VI

On the other hand, if $A_1$ is the direct bond and $A_2$ is the imino group, then Y is, e.g. a halogen atom, particularly a chlorine atom, or an acyloxy radical, e.g. a radical of the general Formula VII

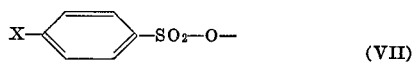

wherein X has the meaning given in Formula II and Z represents a hydrogen atom.

The reactions of compounds of general Formula III with those of general Formula IV are performed, e.g. in a suitable organic solvent such as dimethyl formamide, acetamide, N,N-dimethyl acetamide or dimethyl sulphoxide, while heating. If an acid is formed as liberated compound Y–Z, the reaction is performed in the presence of an acid binding agent such as pyridine or trimethylamine in methylene chloride.

Reactions of compounds of the general formula V, wherein $R_1$ and/or $R_2$ represent(s) halogen with metal compounds, in particular alkali metal compounds such as sodium compounds, of low alkanols, are most simply performed in the alkanols concerned as solvent while heating, e.g. at boiling temperature or at a raised temperature, in a closed vessel. In addition, dimethyl sulphoxide or dimethyl formamide can also be used as solvent. The same solvents and temperatures are also suitable for the reaction of compounds of general Formula V wherein $R_1$ and/or $R_2$ represent(s) halogen, with alkyl mercaptides, in particular with alkali metal alkyl mercaptides.

To produce compounds of general Formula IV wherein $A_2$ represents the direct bond, Z has the meaning given in Formula IV and $R_1$ that given in Formula I, $R_2$ represents a cyclopropyl radical and $R_3$ is hydrogen, the known low β-oxo-cyclopropane propionic acid alkyl esters, particularly the ethyl or methyl ester, can be used as starting material. These are condensed with thiourea, low O-alkyl isoureas or S-alkyl isothioureas or with amidines of low alkanoic acids such as formamidine and acetamidine, to form 6 - cyclopropyl - 2-thiouracil (6-cyclopropyl-2-mercapto - 4 - pyrimidinol), low 2-alkoxy- or 2-alkylthio-6-cyclopropyl-4-pyrimidinol or 6-cyclopropyl-4-pyrimidinol, or 2-alkyl-6-cyclopropyl-4-pyrimidinols respectively. If desired, 6-cyclopropyl-2-thiouracil can be reduced, e.g. with Raney nickel in the presence of ammonia, to form 6-cyclopropyl-4-pyrimidinol or it can be alkylated, e.g. with dialkyl sulphates or low alkyl halides in the presence of potassium carbonate to form corresponding 2-alkylthio compounds, or, finally, it can be converted by boiling with 10% aqueous chloracetic acid into 6-cyclopropyl uracil. By treating the 4-pyrimidinol derivatives mentioned above with phosphorus oxychloride, e.g. in the presence of diethyl aniline, the corresponding 4-chloropyrimidine derivatives which are embraced by general Formula IV are obtained, and on treating 6-cyclopropyl uracil analogously, 2,4-dichloro-6-cyclopropyl-pyrimidine, which is also embraced by this formula, is obtained. By reacting the monochloro compounds mentioned above with trimethylamine, N - (6-cyclopropyl-4-pyrimidinyl)-N,N,N-trimethyl ammonium chlorides substituted in the 2-position by $R_1$—with the exception of the cyclopropyl radical—are obtained as further compounds of general Formula IV. Corresponding compounds having a low alkylsulphonyl radical as radical Z which can be split off are produced, e.g. by reacting 4-chloro-6-cyclopropyl-pyrimidine, 2,4 - dichloro - 6-cyclopropyl-pyrimidine or 2-alkoxy- or 2-alkyl-4-chloro-6-cyclopropyl-pyrimidines with alkali metal salts of low alkane thiols and oxidising the 4-alkylthio compounds obtained, e.g. with peracetic acid. If the above sequence of reactions is begun with low α-alkyl- or α-alkoxy-β-oxo-cyclopropane propionic acid alkyl esters instead of with the corresponding esters not having an α-substituent, then completely analogous compounds of general Formula IV containing an additional low alkyl or alkoxy group in the 5-position are obtained. The condensation components mentioned, α-alkyl-β-oxo-cyclopropane propionic acid alkyl esters, can be obtained, e.g. from β-oxo-cyclopropane propionic acid alkyl esters and alkyl iodides in the presence of a low sodium alcoholate and the corresponding α-alkoxy-β-oxo-cyclopropane propionic acid alkyl esters can be obtained from α-diazo-β-oxo-cyclopropane propionic acid alkyl esters and a low alkanol in the presence of copper and borotrifluoride etherate.

To produce compounds of the general Formula IV wherein $A_2$ is the direct bond, Z has the meaning given in Formula IV and $R_2$ has that given in Formula I, $R_1$ is a cyclopropyl radical and $R_3$ is hydrogen, first cyclopropane carboxamidine is condensed with low alkanoyl acetic acid alkyl esters or with low malonic acid alkyl esters to form 2-cyclopropyl-4-pyrimidinol or 2-cyclopropyl-6-alkyl-4-pyrimidinols or to form 2-cyclopropyl-4,6-pyrimidine diol. On reacting these hydroxy compounds with inorganic acid halides such as phosphorus oxychloride or thionyl chloride, compounds embraced by general Formula IV containing halogen, particularly chlorine, as radical Z are obtained, i.e. 2-cyclopropyl-4-halogen pyrimidines, 2-cyclopropyl-6-alkyl-4-halogen pyrimidines or 2-cyclopropyl-4,6-dihalogen pyrimidines. The latter compounds can be reacted, e.g. with equimolar amounts of alkali metal compounds of low alkanols or alkane thiols, to form 2-cyclopropyl-6-alkoxy-4-halogen pyrimidines or 2-cyclopropyl-6-alkylthio-4-halogen pyrimidines. Compounds of the general Formula IV having different reactive radicals Z are obtained from the halogen compounds mentioned above, e.g. by reaction with trimethylamine or by reaction with alkali metal salts of low alkane thiols and oxidation of the 4-alkylthio compounds obtained to 4-alkylsulphonyl compounds, e.g.

with peracetic acid. Corresponding pyrimidine derivatives having a low alkyl or alkoxy radical as $R_3$ are produced by using, in the sequences of reactions mentioned above, α-alkyl- or α-alkoxy derivatives of low alkanoyl acetic acid alkyl esters instead of these esters themselves or by using low α-alkyl malonic acid dialkyl esters instead of the low malonic acid dialkyl esters.

Compounds of the general Formula IV wherein $A_2$ is the direct bond, Z has the meaning given in Formula IV, $R_1$ and $R_2$ have those given in Formula I and $R_3$ is a cyclopropyl radical can be produced, for example, starting from low cyclopropyl malonic acid alkyl esters or 2-cyclopropyl alkanoyl acetic acid alkyl esters, particularly 2-cyclopropyl formyl-acetic acid alkyl esters and -acetoacetic acid alkyl esters. On condensing these with amidines of low alkanoic acids such as formamidine and acetamidine, with low O-alkyl isoureas or S-alkyl isothioureas, 5-cyclopropyl-4,6-pyrimidine diol, 2-alkyl-, 2-alkoxy- or 2-alkylthio- 4,6-pyrimidine diols or 5-cyclopropyl-4 - pyrimidinols or 6 - alkyl-5-cyclopropyl-4-pyrimidinols correspondingly substituted in the 2-position are obtained. By reaction with inorganic acid halides such as phosphorus oxychloride or thionyl chloride, the hydroxyl groups are replaced by halogen atoms, particularly chlorine atoms and, e.g., 5-cyclopropyl-4,6-dihalogen pyrimidines or 5-cyclopropyl-4-halogen pyrimidines or 5-cyclopropyl-6-alkyl-4-halogen pyrimidines which can be substituted as defined in the 2-position and which are embraced by general Formula IV are obtained.

Instead of producing pyrimidine derivatives direct by using formamidine or S-alkyl isothioureas in the above mentioned cyclisation reactions suitable therefor, in which pyrimidine derivatives $R_1$ is hydrogen or a low alkylthio radical, also thiourea can be used as reaction component. In this case, 5-cyclopropyl-2-mercapto-4,6-pyrimidine diol, 5-cyclopropyl-2-thiouracil or low 6-alkyl-5-cyclopropyl-2-thiouracils are obtained as direct reaction products. These are then reduced either to compounds having hydrogen as $R_1$ or are alkylated to compounds having a low alkylthio radical as $R_1$ or, finally, are hydrolysed, e.g. by boiling with 10% aqueous chloroacetic acid, to 5-cyclopropyl barbituric acid, 5-cyclopropyl uracil or low 6-alkyl-5-cyclopropyl uracils. These hydroxyl compounds are then converted in the usual way into the corresponding halogen compounds, i.e. into 5-cyclopropyl-2,4,6-trihalogen pyrimidines, 5-cyclopropyl-2,4-dihalogen pyrimidines or low 6-alkyl-5-cyclopropyl-2,4-dihalogen pyrimidines.

Further compounds of general Formula IV having halogen as radical Z are obtained from the above and previously mentioned, optionally 2-substituted 5-cyclopropyl-4,6-dihalogen pyrimidines by reaction with equimolar amounts of alkali metal compounds of low alkanols or alkane thiols. Compounds of the general Formula IV having different reactive radicals Z are obtained, e.g. by reacting the compound mentioned above wherein Z is a halogen atom with trimethylamine or with alkali metal salts of low alkane thiols and then oxidising the 4-alkylthio compounds obtained to form 4-alkylsulphonyl compounds, e.g. with peracetic acid.

Compounds of the general Formula IV wherein $A_2$ is the imino group and Z is hydrogen whilst $R_1$, $R_2$ and $R_3$ have the meanings given in Formula I, i.e. 2-amino-6-cyclopropyl pyrimidine, 4-amino-6-cyclopropyl pyrimidine, 4-amino-2-cyclopropyl pyrimidine, 4-amino-5-cyclopropyl pyrimidine and derivatives thereof substituted as defined in the free positions can be obtained, e.g. by reacting the corresponding 4-halogen- or 4-alkylsulphonyl-6-cyclopropyl pyrimidines, -2-cyclopropyl pyrimidines or -5-cyclopropyl pyrimidines optionally substituted in the 2- and/or 6-position(s) mentioned above with ammonia. However, in some of the cyclisation reactions mentioned above, α-cyano ketones can be used instead of α-acylacetic acid alkyl esters or cyanoacetic acid alkyl esters can be used instead of malonic acid dialkyl esters. In this way, substituted 4-amino-pyrimidines or substituted 4-amino-6-pyrimidinols embraced by general Formula IV are obtained. Starting materials of general Formula IV are obtained from the latter by converting them into substituted 4-amino-6-halogen pyrimidines and, optionally, further modifying into substituted 4-amino-6-alkoxy pyrimidines or 4-amino-6-alkylthio pyrimidines.

The new sulphanilamide derivatives corresponding to the general Formula I are suitable for the preparation of medicaments for internal or external use, e.g. for the treatment of infections caused by gram positive bacteria such as staphylococci, streptococci, pneumococci as well as gram negative bacteria such as *Salmonella typhi*, *Escherichia coli* and *Klebsiella pneumoniae*.

The new active substances are administered peros. The daily dosages vary between 200 and 5,000 mg. for adult patents. Suitable dosage units such as tablets preferably contain 150–700 mg. of an active substance according to the invention. Also corresponding amounts of forms for use not made up into single dosages such as syrups, ointments or powders can also be used.

Dosage units for oral administration preferably contain between 60% and 90% of a compound of general Formula I as active substance. They are produced by combining the active substance with, e.g., solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols of suitable molecular weights, to form tablets.

The following prescription further illustrates the production of tablets:

50.000 kg. of $N^1$-acetyl-$N^1$-(6-cyclopropyl-4-pyrimidinyl)-sulphanilamide are mixed with 2.000 kg. of dried potato starch. The mass obtained is moistened with 1.200 kg. of stearic acid in 4 litres of ethanol and the whole is mixed for 15 minutes. 1.200 kg. of gelatine in 16 litres of distilled water are then added and the mass is kneaded for 20 minutes. As soon as it is sufficiently moist, it is granulated through a sieve (25 meshes/sq. cm.) and dried. The dried granules are again sieved (60 meshes/sq. cm.) and then mixed for 1 hour with 4.000 kg. of potato starch, 1.200 kg. of talcum and 0.400 kg. of sodium carboxymethyl cellulose. The mass obtained is pressed into 100,-000 tablets each weighing 600 mg. and containing 500 mg. of active substance.

The following examples further illustrate the production of the new compounds of general Formula I and of hitherto undescribed intermediate products but they in no way limit the scope of the invention. The temperatures are given in degrees centigrade.

Example 1

(a) 23.2 g. of thiourea and then 34 g. of β-oxo-cyclopropane propionic acid ethyl ester are added to a solution of 10 g. of sodium in 220 ml. of dry ethanol. The mixture is stirred and heated at an oil bath temperature of 80–85°. After 10 minutes the mixture thickens whereupon another 50 ml. of dry ethanol are added. The mixture is stirred for 7 hours at 80–85° bath temperature. The reaction mixture is concentrated under 12 torr. On addding water to the residue a cloudy solution is formed. This is extracted three times with ether whereupon it becomes completely clear. The pH of the aqueous solution is then adjusted to 2–3 with 5 N hydrochloric acid, the precipitate is filtered off under suction and dried over phosphorus pentoxide in a vacuum desiccator. The 6-cyclopropyl - 2 - thiouracil (6 - cyclopropyl - 2 - mercapto - 4 - pyrimidinol) obtained melts at 234–237° with gas development. It is sufficiently pure for the following reactions. To attain a substance sufficiently pure for analysis it is recrystallised from aqueous ethanol whereupon it then melts at 236–238° with gas development.

(b) 14.5 g. of crude 6-cyclopropyl-2-thiouracil are stirred into a mixture of 230 ml. of water and 23 ml. of concentrated ammonia and the mixture is heated to 80°. 52 g. of moist Raney nickel are then added in portions whereupon the mixture foams. When the metal has been added, the mixture is stirred at a bath temperature of 120–130° for 1½ hours. After the nickel has settled, the solution is decanted as far as possible and the catalyst is removed from the remainder of the solution by filtration under suction. The nickel is washed twice with 100 ml. of boiling water each time. The filtrates are combined and concentrated. The crude residue, 6-cyclopropyl-4-pyrimidinol, weighs 7.7 g. and melts at 163–165°. During the concentration, part of the substance passes over with the steam. Thus, the pH of the distillate is adjusted to 6–7 and it is continuously extracted with ether for 24 hours. An additional 1.4 g. of 6-cyclopropyl-4-pyrimidinol is gained.

(c) 36 ml. of phosphorus oxychloride and 7.2 ml. of N,N-diethyl aniline are mixed and 7.2 g. of crude 6-cyclopropyl-4-pyrimidinol are sprinkled in. The mixture is heated for 30 minutes at a bath temperature of 90° and the brown solution obtained is concentrated in vacuo. The oily residue is poured onto ice and the emulsion is extracted three times with ether. The ether solution is washed first with ice cold 5% sodium bicarbonate solution and then with saturated sodium chloride solution. The solution is dried over sodium sulphate and the ether is distilled off whereupon 6.7 g. of crude 4-chloro-6-cyclopropyl pyrimidine remain. It is distilled over a short Vigreux column; under 12 torr it passes over at 97–98° and 4.3 g. of a colourless oil are obtained which crystallises after a short time.

(d) 3.9 g. of 4-chloro-6-cyclopropyl pyrimidine are dissolved in 60 ml. of a solution obtained by saturating anhydrous ethanol with ammonia gas under ice cooling. The solution is heated for 5 hours in an autoclave at 90–95° and then the reaction mixture is evaporated to dryness in vacuo. The residue is shaken with 10 ml. of 2 N hydrochloric acid and 30 ml. of ether, the phases are separated and the ethereal phase is again extracted with 10 ml. of 2 N hydrochloric acid. The aqueous acid extracts are combined and made strongly alkaline with 10 N sodium hydroxide solution whereupon the crude amine precipitates. It is dissolved in ether and the ethereal solution is dried with sodium sulphate. Pure 4-amino-6-cyclopropyl pyrimidine is obtained by crystallisation from ether/hexane, M.P. 151–153°.

(e) 3.0 g. of 4-amino-6-cyclopropyl pyrimidine are dissolved in 30 ml. of dry pyridine and 1.8 g. of N-benzyloxycarbonyl-sulphanilyl chloride (cf. H. Gregory, J. Chem. Soc. 1949, 2066) are added in portions. The reaction mixture is stirred, first for 14 hours at room temperature and then for 2 hours 60° and then evaporated to dryness in vacuo. The residue is stirred with water and the mixture obtained is made strongly acid by the addition of concentrated hydrochloric acid. The precipitate is filtered off and dissolved in acetic acid and the $N^4$-benzyloxycarbonyl-$N^1$-(6-cyclopropyl-4-pyrimidinyl)-sulphanilamide is crystallised by the addition of water. It is filtered off and dried for 16 hours under high vacuum at 90–100°. M.P. 203–204°.

(f) A mixture of 50 ml. of pyridine, 10 ml. of acetanhydride and 10 g. of $N^4$-benzyloxycarbonyl-$N^1$-(6-cyclopropyl-4-pyrimidinyl)-sulphanilamide is stirred for 40 hours at 40°, a further 5 ml. of acetanhydride being added after the 20th hour. After cooling, the reaction mixture is diluted with 50 ml. of ether, shaken with a small amount of active charcoal, filtered and 500 ml. of hexane are slowly added to the filtrate. The precipitated crude product is filtered off under suction and recrystallised from tetrahydrofuran and ether. $N^4$-benzyloxycarbonyl-$N^1$-acetyl-$N^1$-(6-cyclopropyl-4-pyrimidinyl)-sulphanilamide is obtained, M.P. 190–192°.

(g) 5 g. of the crude product according to (f) are dissolved in 500 ml. of dry dioxane and the solution is hydrogenated in the presence of 10 g. of palladium-aluminium oxide catalyst (0.7% Pd). After 3 hours, no more starting material can be traced by thin layer chromatography. The mixture is filtered and the filtrate is lyophilised. Practically pure, pulverulent $N^1$-acetyl-$N^1$-(6-cyclopropyl-4-pyrimidinyl)-sulphanilamide remains as residue. After crystallisation from tetrahydrofuran/ether, the product melts at 117–118°.

The following compounds, for example, can be produced in an analogous way if, in step (d), the corresponding substituted chloropyrimidine is used or in step (e) the corresponding substituted aminopyrimidine is used:

$N^1$-(acetyl-$N^1$-(2-cyclopropyl-4-pyrimidinyl)-sulphanilamide (using 4-chloro-2-cyclopropyl pyrimidine);

$N^1$-acetyl-$N^1$-(6-cyclopropyl-2-methyl-4-pyrimidinyl)-sulphanilamide (using 4-chloro-6-cyclopropyl-2-methyl pyrimidine oily);

$N^1$-acetyl-$N^1$-(2-cyclopropyl-6-methyl-4-pyrimidinyl)-sulphanilamide (using 4-chloro-2-cyclopropyl-6-methyl pyrimidine, B.P. 104–107/12 torr).

Example 2

(a) 17.6 g. of α-diazo-β-oxo-cyclopropane propionic acid ethyl ester (cf. L. J. Smith & S. McKenzie, J. Org. Chem. 15, 74 (1950)) are dissolved in 135 ml. of dry methanol. This solution, with the addition of 1 g. of copper powder and 4 drops of borotrifluoride etherate, is heated at a bath temperature of 60–70°. At first strong development of nitrogen occurs which is completed after 2 hours. The reaction mixture is then filtered and the filtrate is evaporated to dryness. The oil which remains is fractionated whereupon pure α-methoxy-β-oxo-cyclopropane propionic acid ethyl ester is obtained, B.P. 60–61°/0.1 torr.

(b) 2.25 g. of sodium are added to 45 ml. of dry ethanol whereupon 8.75 g. of thiourea and then 12.25 g. of the ester obtained according to Example 2(a) are added. The mixture is then refluxed for 7 hours. The ethanol is distilled off in vacuo, the residue is dissolved in 25 ml. of warm water and the solution is decolourized with 25 ml. of active charcoal. The active charcoal is filtered off and the pH of the filtrate is adjusted to 6 with 5 N hydrochloric acid. The suspension obtained is then left to stand for 1 hour at 0° and the crude 2-mercapto-5-methoxy-6-cyclopropyl-4-pyrimidinol is filtered off under suction. It is washed with water and dried in vacuo whereupon it melts at 208–210° with decomposition. Recrystallisation of the crude product from ethanol yields the pure compound which melts at 211–213° under decomposition.

(c) 8 g. of the crude mercatpo compound produced according to Example 1(b) are added to 100 ml. of distilled water and 10 ml. of 25% (by weight) of aqueous ammonia. The mixture is heated to 70–80° while stirring, 24 g. of Raney nickel in the form of a moist paste are added in portions whereupon the suspension is heated for 1½ hours in a 110–120° hot bath while continuing stirring. The precipitate is filtered off and washed twice with hot water. The filtrates are evaporated to dryness in vacuo and the residue is dried over phosphorus pentoxide. The crude 5-methoxy-6-cyclopropy l-4-pyrimidinol obtained melts at 113–116°. Sublimation of the crude product at 90–100°/0.1 torr yields the pure compound; it melts at 120–122°.

(d) 5.7 g. of the crude 5-methoxy-6-cyclopropyl-4-pyrimidinol are added to 36 ml. of ice cold phosphorus oxychloride and then 2.6 ml. of N,N-dimethylaniline are added. The mixture obtained is stirred at a bath temperature of 90–100° for 1½ hours, then the excess phosphorus oxychloride is distilled off under vacuum and the residue is poured onto ice. The suspension obtained is extracted three times with 50 ml. of ether each time, the ether extract is washed, first with water, then with 5% (by weight) of sodium hydrogen carbonate solution and again with water, dried over sodium sulphate and concentrated. The residue, crude, oily 4-chloro-5-methoxy-6-cyclopropyl pyrimidine is used direct for the following reaction.

(e) $N^1$-acetyl-$N^1$-(6-cyclopropyl - 5-methoxy-4-pyrimidinyl)-sulphanilamide is obtained analogously to Example 1(d) to (g) from the 4-chloro-5-methoxy-6-cyclopropyl pyrimidine.

I claim:
1. A compound of the formula

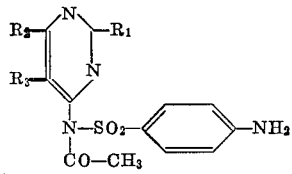

wherein a single one of $R_1$, $R_2$ and $R_3$ represents cyclopropyl, and, when not representing cyclopropyl, $R_1$ and $R_2$ independently of each other represent hydrogen, halogen, lower alkyl, lower alkoxy or lower alkylthio, and $R_3$ represents hydrogen, lower alkyl or lower alkoxy.

2. A compound as defined in claim 1, wherein each of $R_1$ and $R_3$ are hydrogen and $R_2$ is cyclopropyl.
3. A compound as defined in claim 1, wherein $R_1$ is hydrogen, $R_2$ is cyclopropyl and $R_3$ is methoxy.

References Cited

UNITED STATES PATENTS

| 2,891,949 | 6/1959 | Webb et al. | 260—239.75 |
| 3,422,098 | 1/1969 | Schmidt et al. | 260—239.75 |

FOREIGN PATENTS

| 670,903 | 4/1966 | Belgium. |

JOHN D. RANDOLPH, Primary Examiner

C. M. SHURKO, Assistant Examiner

U.S. Cl. X.R.

260—251, 256.4, 256.5, 397.7, 505, 543, 545, 556; 424—229